O. G. RIESKE.
DISK ATTACHMENT FOR DRILLS.
APPLICATION FILED DEC. 27, 1909.
1,015,458.
Patented Jan. 23, 1912.
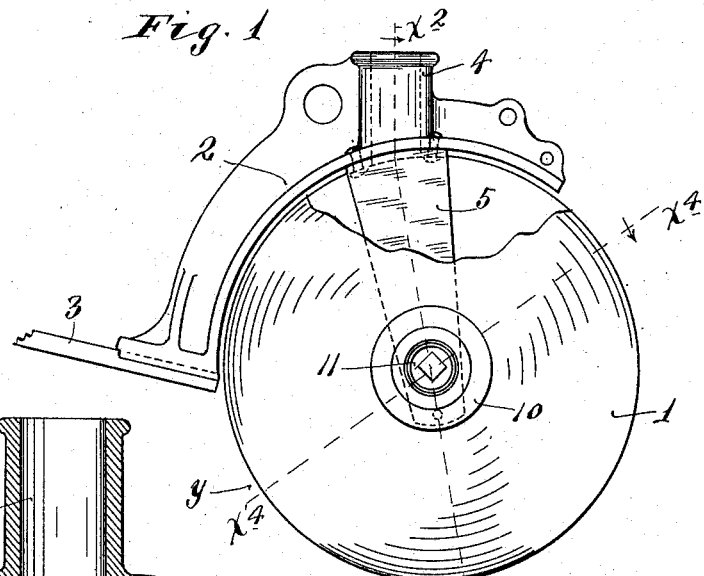
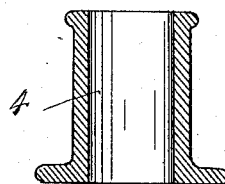
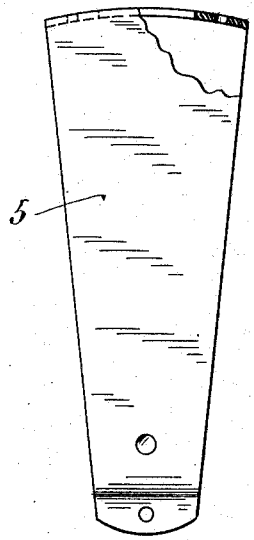
Witnesses.
A. H. Opsahl.
W. H. Souba.
Inventor.
Otto George Rieske.
By his Attorneys
Williamson Merchant
COLUMBIA PLANOGRAPH CO., WASHINGTON, D. C.

UNITED STATES PATENT OFFICE.

OTTO G. RIESKE, OF ST. LOUIS PARK, MINNESOTA, ASSIGNOR TO MONITOR DRILL COMPANY, OF ST. LOUIS PARK, MINNESOTA, A CORPORATION OF MINNESOTA.

DISK ATTACHMENT FOR DRILLS.

1,015,458.  Specification of Letters Patent.  Patented Jan. 23, 1912.

Application filed December 27, 1909. Serial No. 534,967.

*To all whom it may concern:*

Be it known that I, OTTO G. RIESKE, a citizen of the United States, residing at St. Louis Park, in the county of Hennepin and State of Minnesota, have invented certain new and useful Improvements in Disk Attachments for Drills; and I do hereby declare the following to be a full, clear, and exact description of the invention, such as will enable others skilled in the art to which it appertains to make and use the same.

My invention has for its object to provide an improved disk attachment for drills or seeding machines, and is in the nature of an improvement on the device disclosed and broadly claimed in my pending application, S. N. 525,018, filed October 28th, 1909, entitled "Disk attachment for drills."

The invention consists of the novel devices and combinations of devices hereinafter described and defined in the claims.

The present application, as well as the said prior application, has for its primary object the provision of simple and efficient means for maintaining engagement of the converging edges of the disks and to compensate for irregularities in the surfaces of the disks and for wear or diminution of the diameters of the disks under usage.

In the accompanying drawings, which illustrate the invention, like characters indicate like parts throughout the several views.

Referring to the drawings, Figure 1 is a view in side elevation, with some parts broken away, showing a double disk attachment for drills embodying the features of the present invention; Fig. 2 is a vertical section taken approximately on the line $x^2$ $x^2$ of Fig. 1, some parts being broken away and some being left in full; Fig. 3 is a detail in side elevation, showing the spring leg member of the seed boot; and Fig. 4 is a section through the disks on the line $x^4$ $x^4$ of Fig. 1, other parts being removed.

The disks are indicated by the numeral 1 and the main body or cast portion of the seed boot is indicated by the numeral 2. This seed boot 2 is provided with the customary forwardly and downwardly curved arm, to which a coöperating drag bar 3 is secured in the usual or any suitable way. The spout 4 of the seed boot, in its preferred construction, is made short and it is located in front of the vertical line intersecting the projecting axes of the disks.

In lieu of the customary single cast leg interposed between the disks and to which the disks are usually journaled, the present invention provides a pair of laterally spaced depending legs, the upper portions of which are attached to the seed boot and to the lower portions of which the disks are journaled. Preferably these two depending legs are made from a single piece of approximately flat spring steel 5 bent into approximately inverted U-shaped form with the transverse upper portions of the same riveted or otherwise rigidly secured to the body 2 of the seed boot, below the spout 4, and having a large central passage that registers with the passage in said spout. The extreme lower ends of the legs of this U-shaped leg member 5 are spaced apart by a small spacing thimble 6 and are tied together by a small nut bolt 7, passed through said thimble and through the ends of the said legs. In this way, the lower ends of the spring legs are held properly spaced but are nevertheless capable of twisting or torsional movements. Furthermore, as a feature of this invention, the said spring legs are normally given a slight twist so that they are put under a spring tension or torque, which will serve to automatically keep the converging edges of the disks pressed together approximately at the point marked $y$ on Fig. 1. Trunnions 8, upon which the disks are journaled, are rigidly secured to the lower end portions of the spring boot legs by any suitable means and, as shown, is accomplished by machine screws 9, although, in practice, the said trunnions would usually be riveted to the said legs. The disks are detachably journaled to the said trunnions, preferably by means disclosed and claimed in my companion application, S. N. 534,966, filed of date Dec. 27th, 1909, entitled "Disk journals." This journal construction may, therefore, be here briefly described as follows: Internally threaded screw plates 10 are rigidly secured to the outer faces of the disks, and journal caps 11, which fit the trunnions 8, are screwed into the said plates 10. The journal caps 11 hold in position split or sectional lock rings 12 that are seated and partly embedded in grooves formed in the trunnions 8, close to the adjacent hub portions of the disks 1. In this way, the disks are held on the trunnions with freedom for rotation.

The laterally spaced spring boot legs serve as supports for the disk journals and as an automatic spring tension device for maintaining engagement between the converging edges of the disks, to compensate for irregularities in the surfaces of the disks and for wear of the edges of the disks that results in the decreasing of the diameters of said disks. Furthermore, these laterally spaced boot legs afford an unobstructed passage or open space between the disks and through which the seeds (usually delivered through the boot spout 4 by a seed delivery tube, not shown) may fall into the furrow, either in front or at the rear of the axes of the disk journals or on the vertical line of the projecting axes of the said journals. With the spout 4 of the seed boot located in front of the axes of the disk journals, the seeds will be dropped therefrom, and will fall freely and unguided between the laterally spaced boot legs, and into the furrow at a point in front of the disk journals.

In the specification and the claims, the term "seed boot" has been used in a very liberal and broad sense to include a part to which the disks are connected by means of the laterally spaced so-called boot legs.

What I claim is:

1. A double disk attachment comprising a seed boot having laterally spaced depending downwardly converging legs and converging disks located outside of the said legs and journaled thereto with their converging edges in contact.

2. A double disk attachment, comprising a seed boot having laterally spaced depending legs and converging disks journaled to said legs, the said legs being set under spring tension and having movement serving to maintain engagement between the converging edges of the said disks and to thereby compensate for irregularities in the surfaces thereof and for diminution of the size due to wear.

3. A double disk attachment, comprising a seed boot having laterally spaced depending spring legs and converging disks journaled to said legs, the said spring legs having in themselves a normal spring tension serving to maintain engagement between the converging edges of the said disks, and to thereby compensate for irregularities in the surfaces of the said disks and for diminution of the size due to wear.

4. A double disk attachment comprising a seed boot having laterally spaced depending and downwardly converging legs, converging disks located outside of said legs and journaled to the lower portions thereof, with their converging edges in contact, and a seed delivery spout arranged to deliver seed between said disks, in front of the projected axes thereof, but at the rear of the converging edges of said disks.

5. A double disk attachment, comprising a seed boot having laterally spaced depending legs, converging disks located outside of said legs and journaled to the lower portions thereof, with their converging edges in contact, and with the journals of the said disks projecting outward therefrom, and a seed delivery spout arranged to deliver seed into the furrow opened by said disks.

6. A double disk attachment, comprising a seed boot having a seed spout and a pair of laterally spaced spring boot legs depending therefrom, and a pair of converging disks journaled to the lower end portions of the said spring boot legs, the spring tension of which boot legs serves to maintain engagement between the converging edges of said disks, substantially as described.

7. A double disk attachment, comprising a seed boot, an approximately U-shaped spring member rigidly secured to the body of the seed boot and affording laterally spaced spring legs depending therefrom, and converging disks journaled to the lower portions of the said boot legs, the spring tension of said legs serving to maintain engagement between the converging edges of said disks, substantially as described.

8. A double disk attachment, comprising a seed boot having a seed spout, an approximately U-shaped spring member having its bowed upper portion rigidly secured to said boot and perforated in line with the passage through said spout, the depending portions of said U-shaped member affording laterally spaced boot legs, and converging disks journaled to the lower portions of said boot legs with the axes of their journals located at the rear of said seed spout, substantially as described.

9. A double disk attachment comprising a seed boot having laterally spaced depending legs, converging disks located outside of said legs and journaled to the lower portion thereof, and a spout for delivering seeds between said disks, the space between the said depending legs being clear and unobstructed downward from said seed delivering spout to a point materially below the projecting axes of said disks.

10. A double disk attachment comprising a seed boot having laterally spaced depending legs and converging disks located entirely outside of the said legs, and journaled thereto said disks having contact at their converging edges, and means for delivering seeds into the furrows opened by said disks 11. A double disk attachment comprising a seed boot having laterally spaced depending legs and converging disks located entirely outside of the said legs and journaled thereto said disks having contact at their converging edges, and a seed delivery spout arranged to deliver the seeds between said disks at a point in front of the projecting axes of said disks but at the rear of the contacting edges of said disks.

12. In a double disk attachment, a seed boot having laterally spaced depending legs extending downwardly therefrom and converging disks located outside of the said legs and journaled thereto, the said disks having contact at their converging edges.

In testimony whereof I affix my signature in presence of two witnesses.

OTTO G. RIESKE.

Witnesses:
MARIE E. LAPALME,
HARRY D. KILGORE.

Copies of this patent may be obtained for five cents each, by addressing the "Commissioner of Patents, Washington, D. C."